United States Patent
Chang (10) Patent No.: US 9,462,098 B2
(45) Date of Patent: Oct. 4, 2016

(54) PORTABLE TERMINAL HOUSING

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 113 days.

(21) Appl. No.: 14/498,134

(22) Filed: Sep. 26, 2014

(65) Prior Publication Data

US 2015/0208526 A1    Jul. 23, 2015

(30) Foreign Application Priority Data

Jan. 20, 2014    (CN) .......................... 2014 1 0024576

(51) Int. Cl.
*H04M 1/18* (2006.01)
*H04M 1/02* (2006.01)
*G06F 1/16* (2006.01)

(52) U.S. Cl.
CPC .............. *H04M 1/18* (2013.01); *G06F 1/1656* (2013.01); *H04M 1/0249* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,158,376 B2 * | 1/2007 | Richardson | ........... | G06F 1/1626 361/679.56 |
| 7,180,735 B2 * | 2/2007 | Thomas | .................. | G06F 1/626 206/701 |
| 7,907,394 B2 * | 3/2011 | Richardson | ........... | G06F 1/1613 312/223.1 |
| 8,164,899 B2 * | 4/2012 | Yamaguchi | ........... | G06F 1/1616 220/4.21 |
| 8,342,325 B2 * | 1/2013 | Rayner | .................. | G06F 1/1626 206/305 |
| 8,503,170 B1 * | 8/2013 | Hsu | ....................... | G06F 1/1626 206/320 |
| 9,042,095 B2 * | 5/2015 | Song | ..................... | G06F 1/1626 361/679.21 |
| 9,204,697 B2 * | 12/2015 | Yang | ..................... | A45C 11/00 |
| 9,208,961 B2 * | 12/2015 | Wu | .......................... | H01H 9/02 |
| 2006/0104021 A1* | 5/2006 | Chen | ..................... | G06F 1/1628 361/679.56 |
| 2013/0314863 A1* | 11/2013 | Tanaka | ................... | H04M 1/18 361/679.01 |

* cited by examiner

*Primary Examiner* — Lisa Lea Edmonds
(74) *Attorney, Agent, or Firm* — Zhigang Ma (57) ABSTRACT

A portable terminal housing includes a first housing body, a second housing body engaged with the first housing body, a middle frame, and a ring cushion coiled around the middle frame. The first housing body and second housing body can cooperatively form a receiving cavity. The middle frame and ring cushion are positioned in the receiving cavity. The middle frame resists against the inner surface of the first housing body and second housing body by the ring cushion. The middle frame covers a joint of the first housing body and second housing body.

17 Claims, 6 Drawing Sheets

PORTABLE TERMINAL HOUSING

FIELD

The subject matter herein generally relates to an electric device and particularly to a portable terminal housing.

BACKGROUND

A mobile phone, a personal digital assistant (PDA), a camera or the like are important electrical portable terminal products. As portable terminals are unavoidably exposed to the outside environment during use, waterproof structures are positioned in the portable terminals to provide waterproofing.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, "substantially cylindrical" means that the object resembles a cylinder, but can have one or more deviations from a true cylinder. The term "comprising", when utilized, means "including, but not necessarily limited to"; it specifically indicates open-ended inclusion or membership in the so-described combination, group, series and the like.

The present disclosure is described in relation to a portable terminal housing 100.

Figure 1:
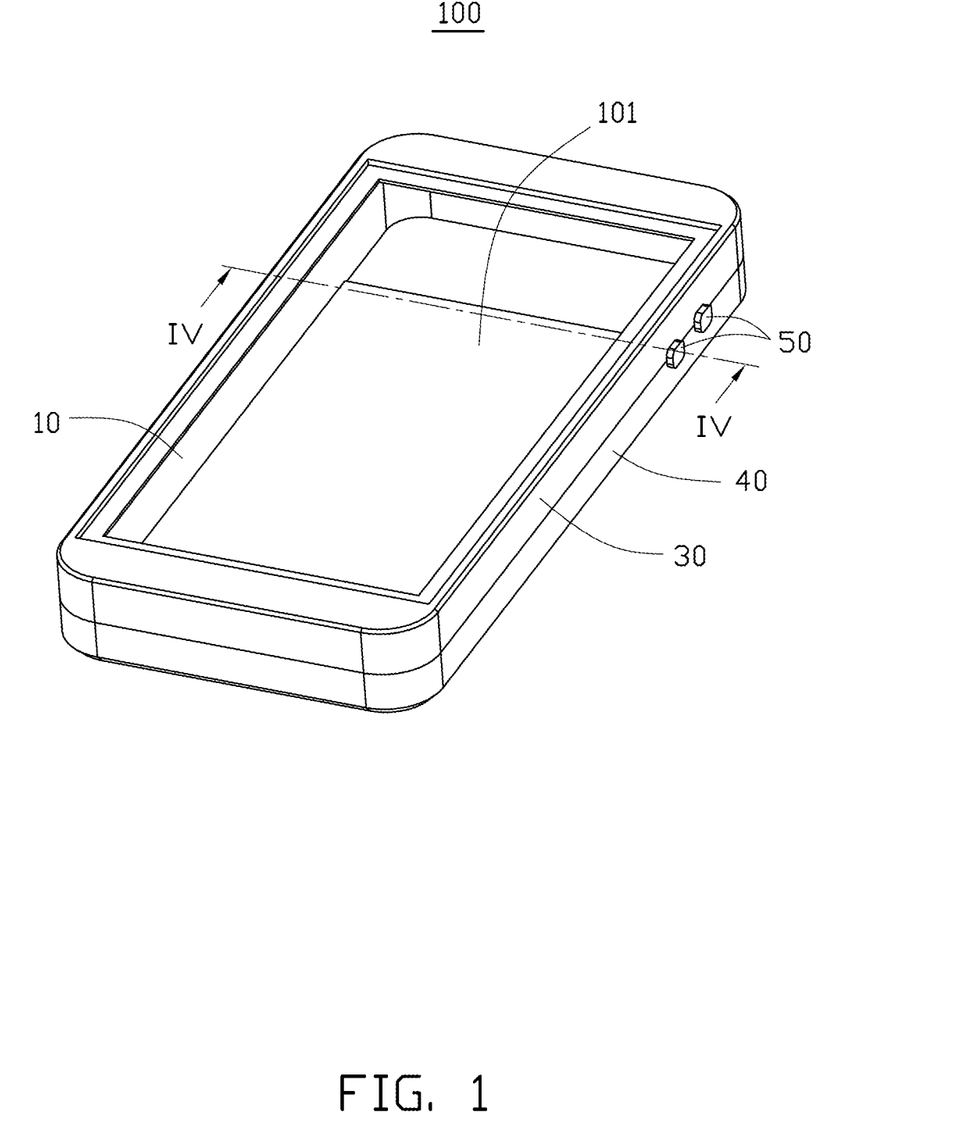
FIG. 1 is a perspective view of a portable terminal housing according to an embodiment of this disclosure.
Figure 2:
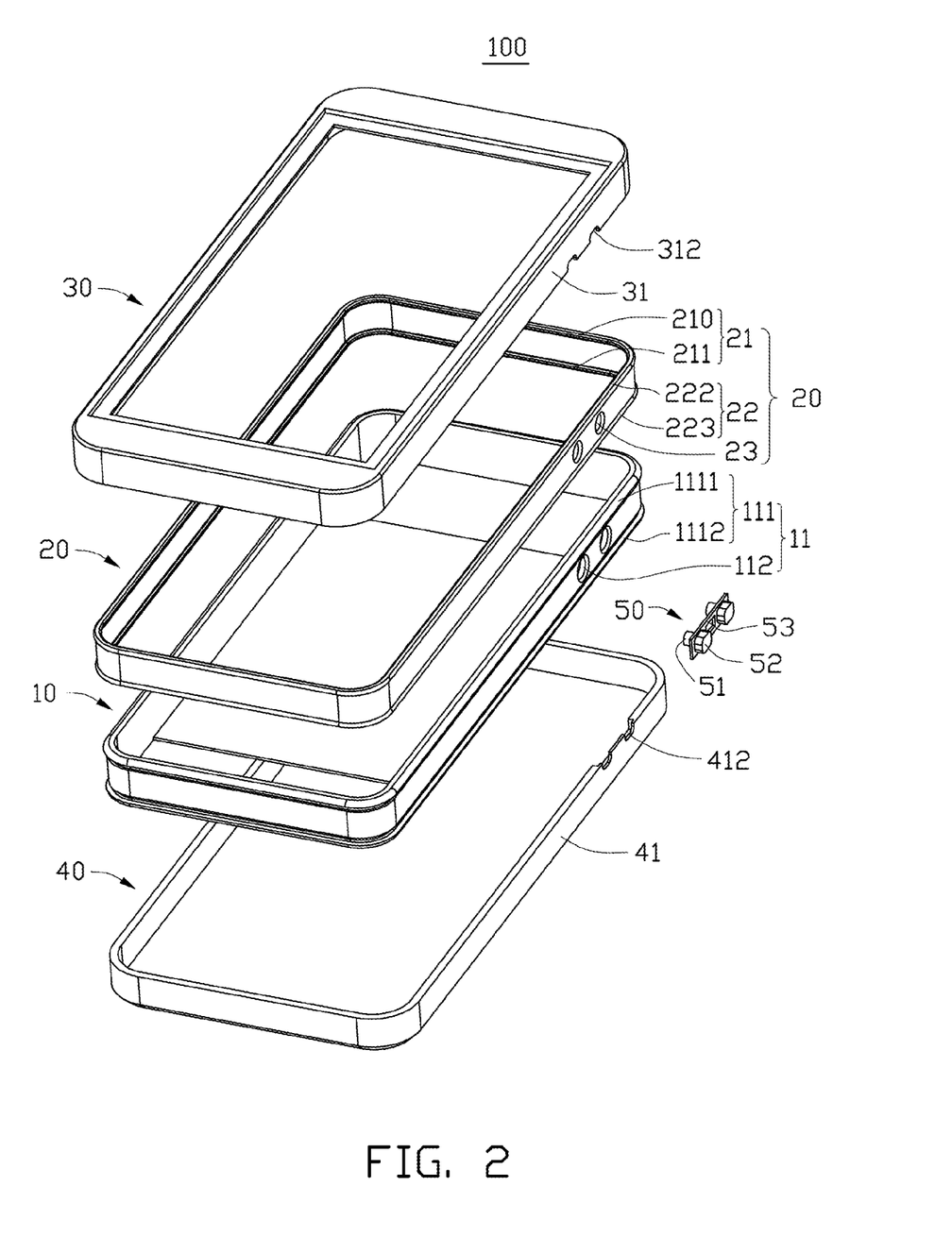
FIG. 2 is an exploded, perspective view of the portable terminal housing as shown in FIG. 1.

FIG. 1 illustrates a perspective view of a portable terminal housing according to an embodiment of this disclosure. FIG. 2 illustrates an exploded perspective view of the portable terminal housing as shown in FIG. 1. FIGS. 1-2 illustrate that a portable terminal housing 100 can include a middle frame 10, a ring cushion 20, a first housing body 30, a second housing body 40, and two buttons 50. The first housing body 30 can engage the second housing body 40. The first housing body 30 and the second housing body 40 can cooperatively form a receiving cavity 101. The middle frame 10 and the ring cushion 20 can be positioned in the receiving cavity 101. The middle frame 10 can elastically resist against the inner surface of the first housing body 30 and the second housing body 40 by the ring cushion 20. The middle frame 10 can cover a joint of the first housing body 30 and the second housing body 40.

The two buttons 50 can be coupled to the first housing body 30 and the second housing body 40. Each of the two buttons 50 can be positioned between the first housing body 30 and the second housing body 40.

FIG. 2 illustrates that the middle frame 10 can be a rectangular frame and include four peripheral walls 11 connected to each other one by one. The four peripheral walls 11 can cooperatively define a plurality of receiving grooves 111. One of the four peripheral walls 11 can define a plurality of through holes 112. Each receiving groove 111 can be positioned on an outer surface of each peripheral wall 11. Each receiving groove 111 can be annular and enclose each peripheral wall 11.

In at least one embodiment, the plurality of receiving grooves 111 can be two. The plurality of receiving grooves 11 can be spaced from each other. The plurality of the receiving grooves 111 can include a first receiving groove 1111 and a second receiving groove 1112. In other embodiments, the plurality of receiving grooves 111 can be more than two. The first receiving groove 1111 can be positioned adjacent to the first housing body 30. The second receiving groove 1112 can be positioned adjacent to the second housing body 40. The first receiving groove 1111 and the second receiving groove 1112 are spaced from each other. In at least one embodiment, the first receiving groove 1111 can be located on an upper end of the each peripheral wall 11, and the second receiving groove 1112 can be located on a lower end of each peripheral wall 11. The first receiving groove 1111 and the second receiving groove 1112 can be annular and can cooperatively enclose the four peripheral walls 11.

The two through holes 112 can be substantially circular. In other embodiments, the two through holes 112 can be oval or polygonal. In other embodiments, the plurality of through holes 112 can be more than two. In addition, each of the plurality of the through holes 112 can be located in several different locations on the peripheral walls 11.

The ring cushion 20 can be annular. The ring cushion 20 can include a plurality of inner peripheral protrusions 21, a plurality of exterior peripheral protrusions 22, and a plurality of accommodating portions 23. The ring cushion 20 can be made of an elastic material. Each inner peripheral protrusion 21 can be positioned on an inner surface of the ring cushion 20. Each inner peripheral protrusion 21 can be received in each receiving groove 111. Each exterior peripheral protrusion 22 can be positioned on an exterior surface of the ring cushion 20. Each inner peripheral protrusion 21 and exterior peripheral protrusion 22 can be continuous and enclose the ring cushion 20. In other embodiments, each inner peripheral protrusion 21 and exterior peripheral protrusion 22 can be discontinuous and not enclose the ring cushion 20. In at least one embodiment, the plurality of inner peripheral protrusions 21 can include a first inner peripheral protrusion 210 and a second inner peripheral protrusion 211. A size, number and shape of the first inner peripheral protrusion 210 and second inner peripheral protrusion 211 can match that of the first receiving groove 1111 and the second receiving groove 1112. In at least one embodiment, the plurality of exterior peripheral protrusions 22 can be annular and can be two. In other embodiments, the number of exterior peripheral protrusions 22 can be one or more than two. The size of each exterior peripheral protrusion 22 can match with each receiving groove 111. The number accommodating portions 23 can be two and each can be a substantially circular blind hole. The section of each accommodating portion 23 can be positioned according to that of the two through holes 112. In at least one embodiment, the size, shape, and number of the accommodating portion 23 can match with that of the two through holes 112.

The first housing body 30 can include four first sidewalls 31 connected with each other. The first housing body 30 can be a rectangular frame cooperatively formed by the four first sidewalls 31. Each first sidewall 31 can include a plurality of first arc grooves 312. In at least one embodiment, the plurality of first arc grooves 312 can be two or more. The first arc groove 312 can be positioned on the rim of one first sidewall 31, and can be located on the lower end of the first sidewall 31. In other embodiments, the first arc groove 312 can be located on several different first sidewalls 31. In at least one embodiment, the first arc groove 312 can be substantially semi-circular. In other embodiments, the first arc groove 312 can be oval, or polygon shaped.

The second housing body 40 can be box-shaped and can include four sidewalls 41 connected to each other one by one. The second housing body 40 can include a plurality of second arc grooves 412 according to the plurality of first arc grooves 312. In at least one embodiment, the plurality of second arc grooves 412 can be positioned on the rim of one sidewall 41. The second arc grooves 412 can be located on an upper end of the sidewall 41. In other embodiments, the plurality of second arc grooves 412 can be positioned on several different sidewalls 41. The size, shape, and location of the plurality of second arc grooves 412 can match with that of the plurality of first arc grooves 312. The each second arc groove 412 and the each first arc groove 312 can cooperatively form an annular through hole for each inserted button 50.

Figure 3:
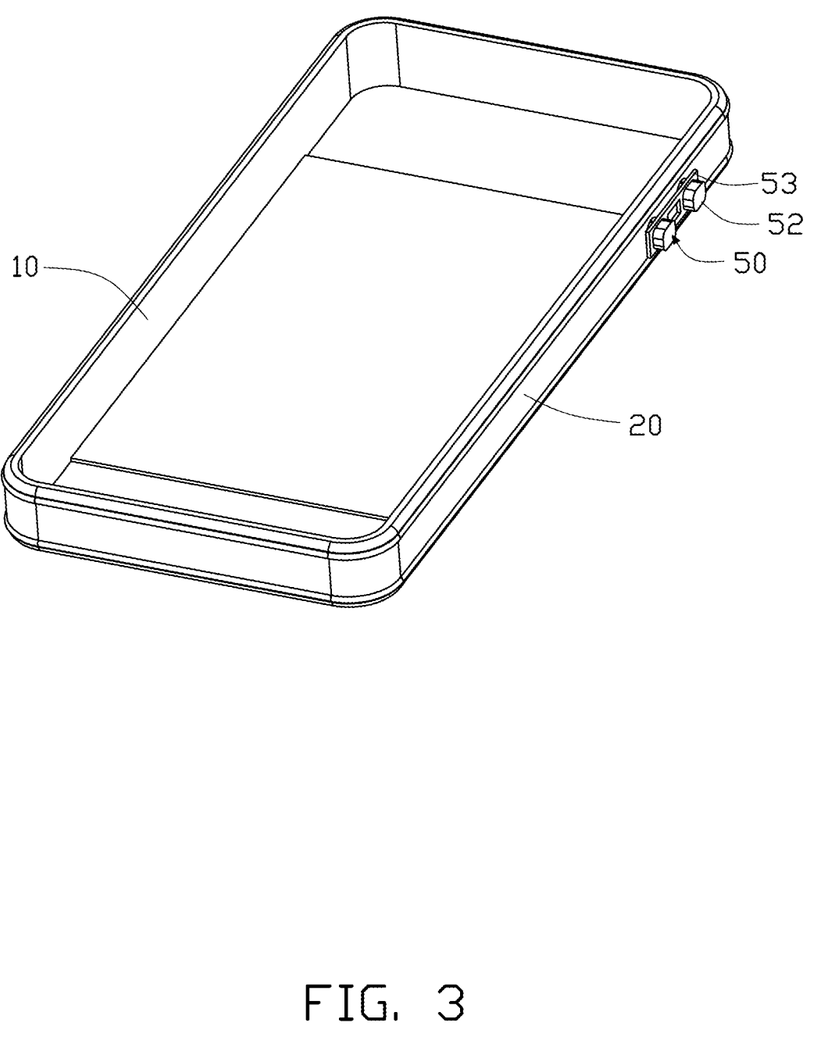
FIG. 3 is a perspective view of a middle frame and a ring cushion shown in FIG. 2.

FIG. 3 illustrates that the ring cushion 20 can be coiled around the middle frame 10. In at least embodiment, the ring cushion 20 can be made of an elastic, a plastic or a rubber. Therefore, the ring cushion 20 can be coiled around the middle frame 10 making it convenient to assemble the portable terminal 100. In at least one embodiment, the middle frame 10 can be made of a metal, such as aluminum alloy, magnesium alloy, titanium alloy, or stainless steel. In other embodiments, the middle frame 10 can be made of a toughened plastic.

Figure 4:
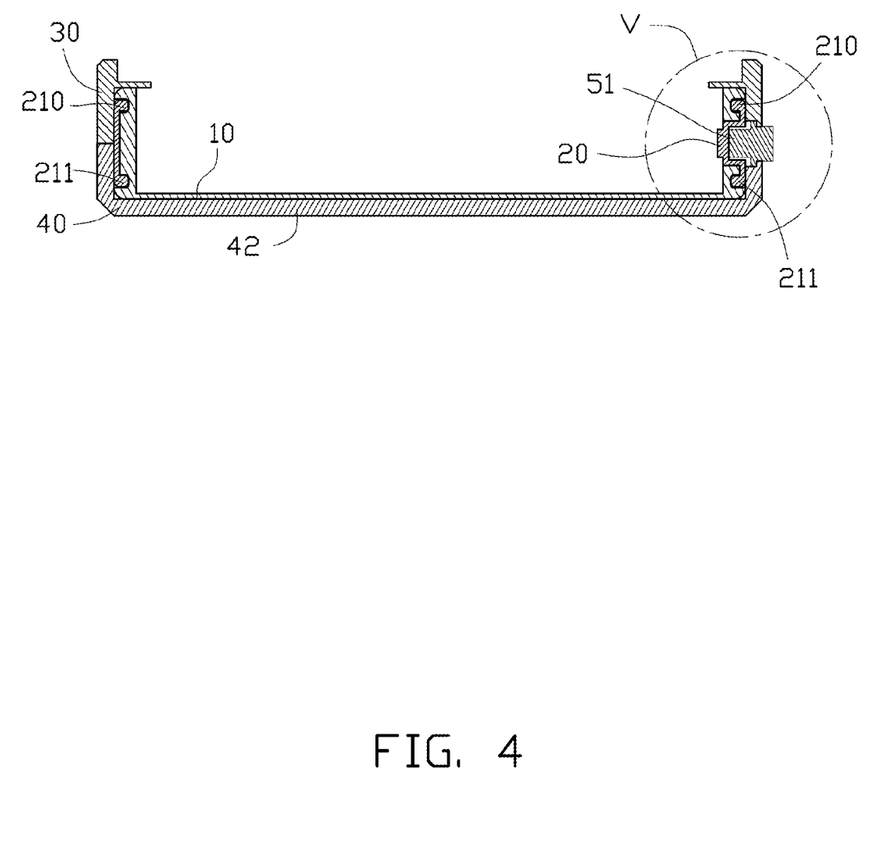
FIG. 4 is a cross-sectional view of the portable terminal housing along line IV-IV as shown in FIG. 1.

FIG. 4 illustrates a cross-sectional view of the portable terminal housing 100 taken along line IV-IV as shown in FIG. 1. In at least one embodiment, the first housing body 30 can serve as an upper housing body of the portable terminal housing 100, and the second housing body 40 can serve as a lower housing body. A center section according to the first housing body 30 can have an opening for receiving display elements (not shown). The first housing body 30 can further include a rim extending toward the center section of the first housing body 30 for supporting the display elements and resisting against one end of the middle frame 10, allowing the middle frame 10 to be firmly coupled to the first housing body 30. Furthermore, the second housing body 40 can include a bottom plate 42 for accommodating electronic elements (not shown) and resisting against the other end of the middle frame 10.

Figure 5:
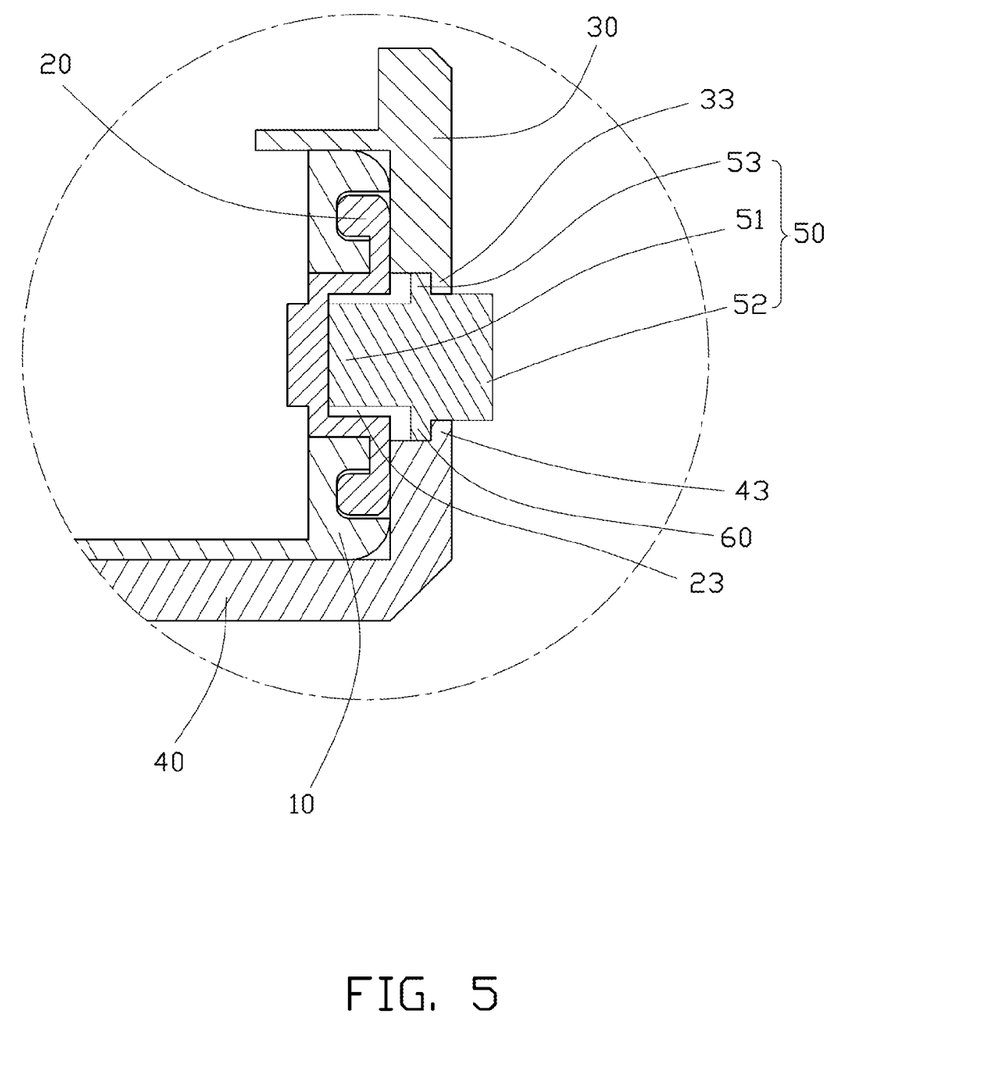
FIG. 5 is an enlarged, cross-sectional view of a circled portion V of the portable terminal housing as shown in FIG. 4.

The two buttons 50 can be positioned in accordance with the two through holes 112 (as shown in FIG. 2) of the middle frame 10. At least one part of each button 50 can be inserted through each through hole 112 and be accommodated in each accommodating portion 23 (as shown in FIG. 5). At the same time, the other part of the each button 50 can be disposed outside the first housing body 30 and the second housing body 40 via the first arc groove 312 and the second arc groove 412 (as shown in FIG. 2).

FIG. 5 illustrates that the two buttons 50 can be substantially cylindrical and can include a rod portion 51, a pressing portion 52, and a limiting portion 53. The rod portion 51 can be accommodated in the accommodating portion 23, whereby the section according to the two buttons 50 can be waterproof. At the same time, the rod portion 51 can extend toward the center section the portable terminal housing 100 serving as a control portion of each button 50 for interacting with the inner electrical elements (not shown). Each pressing portion 52 can be connected with the each rod portion 51. The each limiting portion 53 can be positioned between the rod portion 51 and the pressing portion 52. A cross-section of the rod portion 51 can match with the shape of the accommodating portion 23 of the ring cushion 20. The section of the each rod portion 51 can be in accordance with the section of each accommodating portion 23. Each rod portion 51 can be received in the each accommodating portion 23.

Figure 6:
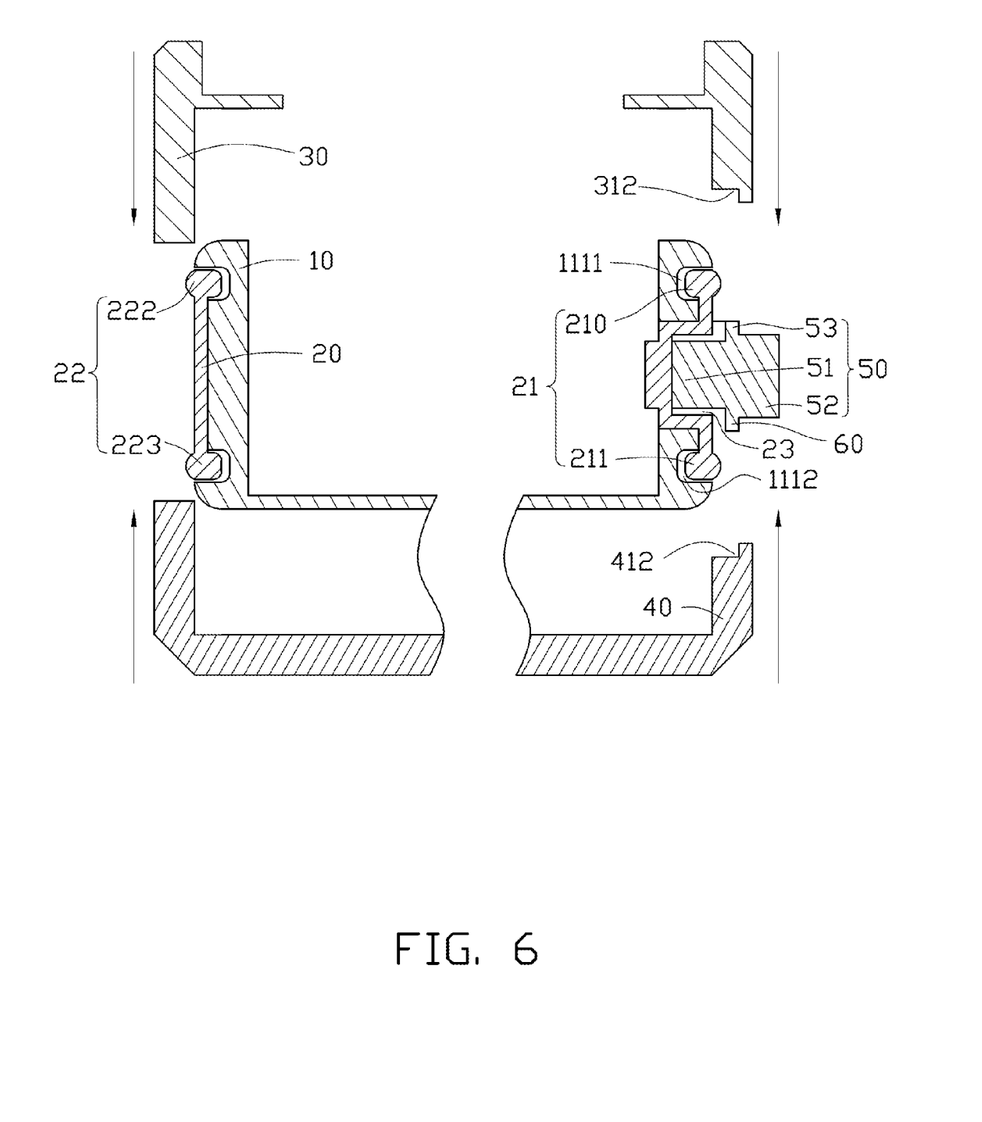
FIG. 6 is an exploded, cross-sectional view of the portable terminal housing as shown in FIG. 1.

One part of the pressing portion 52 can be latched between the first housing body 30 and the second housing body 40. The other part of the pressing portion 52 can extend out of the first housing body 30 and the second housing body 40. FIG. 6 illustrates that the shape and size of the pressing portion 52 can be substantially the same as the shape and size of the first arc groove 312 and the second arc groove 412, whereby the pressing portion 52 can extend to be partially exposed outside the first housing body 30 and the second housing body 40.

The first housing body 30 can have a first resisting portion 33 and the second housing body 40 can each have a second resisting portion 43 adjacent to the first arc groove 312 and second arc groove 412 for resisting against the limiting portion 53 (as shown in FIG. 6). Therefore, the limiting portion 53 can restrict the rod portion 51 between the first housing body 30, the second housing body 40, and the ring cushion 20, whereby the button 50 can be prevented from sliding out of the accommodating portion 23. In at least one embodiment, the limiting portion 53 can be one and integrated with the two buttons 50. In other embodiments, the limiting portion 53 can be more than two and each limiting portion 53 can be integrated with each button 50. In other embodiments, the button 50 can be one or more than two. In at least one embodiment, the rod portion 51 and the pressing portion 52 can be substantially cylindrical.

The cross-section of the rod portion 51 and the pressing portion 52 can be substantially circular. In other embodiments, the cross-section of the rod portion 51 and pressing portion 52 can be substantially oval or polygonal.

The number, shape, and section of the rod portion 51 can match with the each through hole 112 (as shown in FIG. 2). At the same time, the number, shape, and section of the pressing portion 52 can match with the first arc groove 312 and the second arc groove 412 (as shown in FIG. 6). Thus, in other embodiments, the button 50 can be at least one, whereby the number of the through holes 112, the accommodating portion 23, the first arc groove 312 and the second arc groove 412 can be at least one.

FIG. 6 illustrates an exploded, cross sectional view of the portable terminal housing 100 according to an embodiment in this disclosure. In assembly, first, the ring cushion 20 can be coiled around the middle frame 10. At the same time, the first inner peripheral protrusion 210 can be received in the first peripheral groove 1111 and the second inner peripheral protrusion 211 can be received in the second peripheral groove 1112. Each accommodating portion 23 can be inserted through each through hole 112 and can extend toward the center section of the middle frame 10. Then, each rod portion 51 can be received in each accommodating portion 23. Therefore, the ring cushion 20 can be assembled with the middle frame 10.

Subsequently, the first housing body 30 and second housing body 40 can be moved toward each other for engagement. At the same time, the first exterior peripheral protrusion 222 can elastically resist against the first housing body 30, and the second exterior peripheral protrusion 223 can elastically resist against the second housing body 40. In addition, the ring cushion 20 can cover the joint of the first housing body 30 and second housing body 40. Then, each pressing portion 52 can be latched between the first arc groove 312 and second arc groove 412, and the limiting portion 53 can be positioned between and the first arc groove 312, second arc groove 412 and ring cushion 20. The rod portion 51 can be limited between the first housing body 30, second housing body 40 and ring cushion 20. Therefore, the pressing portion 52 can be firmly jointed with the first housing body 30 and second housing body 40 via the first arc groove 312 and the second arc groove 412, the button 50 can be firmly secured on the joint of the first housing body 30 and the second housing body 40. Thus, the assembly of the portable terminal housing 100 can be completed.

The portable terminal housing 100 according to this disclosure can have a ring cushion 20 coiled around the middle frame 10 as a waterproof structure. The number of waterproof structures of the portable terminal housing 100 is less than a normal portable terminal housing. In addition, the ring cushion 20 can cover the joint of the first housing body 30 and second housing body 40, whereby the portable terminal housing 100 can have a better waterproof property than a normal portable terminal housing.

Furthermore, it is convenient to assemble the portable terminal housing 100. In addition, as the portable terminal housing 100 can include a plurality of through holes 112 and accommodating portions 23, at least one part of each button 50 can extend inside the portable terminal housing 100 via each through hole 112, whereby at least one part of each button 50 can be received in the each accommodating portion 23. Therefore, the section in accordance with the location of each button 50 can have good waterproof properties. At the same time, the waterproof structure of the portable terminal housing 100 can be simplified.

The embodiments shown and described above are only examples. Many details are often found in the art such as the other features of a portable terminal housing. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A portable terminal housing comprising: a first housing body; a second housing body engaged with the first housing body; a middle frame comprising a plurality of receiving grooves; and a ring cushion coiled around the middle frame, and comprising a plurality of inner peripheral protrusions, each of the plurality of inner peripheral protrusions received in each of the plurality of receiving grooves; and wherein the first housing body and the second housing body can cooperatively form a receiving cavity; the middle frame and the ring cushion are positioned in the receiving cavity; and the middle frame resists against the inner surface of the first housing body and the second housing body by the ring cushion and covers a joint of the first housing body and the second housing body;

wherein the plurality of receiving grooves comprises a first receiving groove adjacent to the first housing body and a second receiving groove adjacent to the second housing body, the plurality of inner peripheral protrusions comprises a first inner peripheral protrusion and a second inner peripheral protrusion; and the first inner peripheral protrusions is received in the first receiving groove and the second inner peripheral protrusion is received in the second receiving groove.

2. The portable terminal housing as claimed in claim 1, wherein the ring cushion further comprises a plurality of exterior peripheral protrusions.

3. The portable terminal housing as claimed in claim 2, wherein one of the plurality of exterior peripheral protrusions resists against the first housing body.

4. The portable terminal housing as claimed in claim 2, wherein one of the plurality of exterior peripheral protrusions resists against the second housing body.

5. The portable terminal housing as claimed in claim 1, wherein the middle frame can further comprises four peripheral walls, and each of the plurality of receiving grooves encloses the four peripheral walls.

6. The portable terminal housing as claimed in claim 1, wherein each of the plurality of inner peripheral protrusions is positioned on the inner surface of the ring cushion and encloses the ring cushion.

7. The portable terminal housing as claimed in claim 1, wherein
the portable terminal housing further comprises a plurality of buttons, positioned on the joint of the first housing body and the second housing body;
the middle frame defines a plurality of through holes according to the plurality of buttons; and
the ring cushion defines a plurality of accommodating portions according to the plurality of through holes.

8. The portable terminal housing as claimed in claim 7, wherein at least one part of each of the plurality of buttons is inserted into each of the plurality of through holes and is accommodated in each of the plurality of accommodating portions.

9. The portable terminal housing as claimed in claim 8, wherein:
the first sidewall further comprises a plurality of first arc grooves;
the second housing body further comprises a plurality of second arc grooves according to the plurality of first arc grooves; and
each of the plurality of first arc grooves and each of the plurality of second arc grooves cooperatively form an annular through hole for at least one part of each of the plurality of buttons inserting through thereby.

10. The portable terminal housing as claimed in claim 9, wherein each of the plurality of buttons comprises:
a rod portion; and
a pressing portion connected to the rod portion;
wherein the rod portion is received in each of the plurality of accommodating portions; and the pressing portion is located between each of the plurality of first arc grooves and each of the plurality of second arc grooves.

11. The portable terminal housing as claimed in claim 10, wherein each of the plurality of buttons further comprise a limiting portion positioned between the rod portion and the pressing portion.

12. The portable terminal housing as claimed in claim 1, wherein the ring cushion is made of an elastic material.

13. A portable terminal housing comprising:
a first housing body;
a second housing body engaged with the first housing body;
a middle frame; and
a ring cushion coiled around the middle frame; and
a plurality of buttons, positioned on the joint of the first housing body and the second housing body;
wherein the first housing body and the second housing body can cooperatively form a receiving cavity; the middle frame and the ring cushion are positioned in the receiving cavity; and the middle frame resists against the inner surface of the first housing body and the second housing body by the ring cushion and covers a joint of the first housing body and the second housing body;
wherein the middle frame defines a plurality of through holes according to the plurality of buttons; and the ring cushion defines a plurality of accommodating portions according to the plurality of through holes.

14. The portable terminal housing as claimed in claim 13, wherein at least one part of each of the plurality of buttons is inserted into each of the plurality of through holes and is accommodated in each of the plurality of accommodating portions.

15. The portable terminal housing as claimed in claim 14, wherein:
the first sidewall further comprises a plurality of first arc grooves;
the second housing body further comprises a plurality of second arc grooves according to the plurality of first arc grooves; and
each of the plurality of first arc grooves and each of the plurality of second arc grooves cooperatively form an annular through hole for at least one part of each of the plurality of buttons inserting through thereby.

16. The portable terminal housing as claimed in claim 15, wherein each of the plurality of buttons comprises:
a rod portion; and
a pressing portion connected to the rod portion;
wherein the rod portion is received in each of the plurality of accommodating portions; and the pressing portion is located between each of the plurality of first arc grooves and each of the plurality of second arc grooves.

17. The portable terminal housing as claimed in claim 16, wherein each of the plurality of buttons further comprise a limiting portion positioned between the rod portion and the pressing portion.

* * * * *